(12) United States Patent
Sung et al.

(10) Patent No.: US 8,160,627 B2
(45) Date of Patent: *Apr. 17, 2012

(54) SYSTEM FOR ESTABLISHING AND MANAGING MULTIMEDIA POC SESSION FOR PERFORMING MULTIMEDIA CALL SERVICE, METHOD THEREOF AND USER EQUIPMENT THEREFOR

(75) Inventors: Sang-Kyung Sung, Seoul (KR); Ji-Hye Lee, Seoul (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,827

(22) Filed: Nov. 30, 2010

(65) Prior Publication Data

US 2011/0070917 A1    Mar. 24, 2011

Related U.S. Application Data

(63) Continuation of application No. 11/866,135, filed on Oct. 2, 2007, now Pat. No. 7,844,293.

(30) Foreign Application Priority Data

| Oct. 2, 2006 | (KR) | ................................. 2006-97398 |
| Oct. 17, 2006 | (KR) | ............................... 2006-101076 |

(51) Int. Cl.
   *H04B 7/00*    (2006.01)
(52) U.S. Cl. .... 455/518; 455/519; 455/90.2; 455/412.2; 370/230; 709/201
(58) Field of Classification Search .................. 455/518, 455/519, 90.2, 412.2, 550.1, 426.1, 412.1, 455/414.1, 458; 370/351, 352, 230, 236, 353; 375/240.02; 709/231, 227, 201

See application file for complete search history.

(56) References Cited

U.S. PATENT DOCUMENTS

| 6,731,393 | B1 | 5/2004 | Currans et al. |
| 7,675,858 | B2 * | 3/2010 | Dekeyzer et al. ............. 370/236 |
| 7,844,293 | B2 * | 11/2010 | Sung et al. .................... 455/518 |
| 2002/0169797 | A1 * | 11/2002 | Hegde et al. ............... 707/500.1 |
| 2004/0125802 | A1 | 7/2004 | Lillie et al. |
| 2004/0249949 | A1 | 12/2004 | Gourraud et al. |
| 2005/0105511 | A1 | 5/2005 | Poikselka |
| 2005/0124365 | A1 | 6/2005 | Balasuriya et al. |
| 2005/0232241 | A1 | 10/2005 | Wu et al. |

(Continued)

FOREIGN PATENT DOCUMENTS

JP    2006-513610    4/2006

(Continued)

*Primary Examiner* — Tan Trinh
(74) *Attorney, Agent, or Firm* — The Farrell Law Firm, P.C.

(57) ABSTRACT

Provided are a system for establishing and managing a Push To Talk (PTT) over Cellular (PoC) session between PoC clients supporting various media types, a method thereof, and a User Equipment (UE) therefor. When a PoC client performing an Open Mobile Alliance (OMA) PoC multimedia call service supports a plurality of media types, and media types supported by PoC clients are not common, a PoC session can be established to support only media types set to be transmitted in a first response message after the session is established. In addition, a method of efficiently managing a session by updating the session when a newly supported media type is provided or when a recipient of an existing media type is changed is suggested.

27 Claims, 10 Drawing Sheets

U.S. PATENT DOCUMENTS

| | | |
|---|---|---|
| 2006/0040685 A1 | 2/2006 | Kwon |
| 2006/0047704 A1* | 3/2006 | Gopalakrishnan ......... 707/104.1 |
| 2007/0047709 A1 | 3/2007 | Brunson et al. |
| 2007/0067315 A1* | 3/2007 | Hegde et al. .................... 707/10 |
| 2007/0159976 A1* | 7/2007 | Dekeyzer et al. ............. 370/236 |
| 2007/0218932 A1 | 9/2007 | Sung et al. |
| 2007/0298768 A1 | 12/2007 | Lee et al. |
| 2008/0009281 A1 | 1/2008 | Sung et al. |
| 2008/0235322 A1* | 9/2008 | Holm et al. ................... 709/201 |
| 2008/0248826 A1 | 10/2008 | Holm |
| 2009/0055473 A1 | 2/2009 | Synnergren |
| 2009/0144429 A1 | 6/2009 | Astrom |

FOREIGN PATENT DOCUMENTS

| | | |
|---|---|---|
| JP | 2008-506303 | 2/2008 |
| WO | WO 2006/006897 | 1/2006 |
| WO | WO 2006/096023 | 9/2006 |

* cited by examiner

```
v=0
o=alice 2890844526 2890844526 IN IP4 host1.anywhere.com
s=
c=IN IP4 host1.anywhere.com
t=0 0
m=audio 49170 RTP/AVP 0
a=rtpmap:0 PCMU/8000
m=video 51372 RTP/AVP 31
a=rtpmap:31 H261/90000
m=message 7770 TCP/MSRP *
a=accept-types:text/plain
a=path:msrp://alicepc.example.com:7770/iau39;tcp
```

FIG.7A

```
v=0
o=bob 2890844612 2890844616 IN IP4 host2.anywhere.com
s=
c=IN IP4 host2.anywhere.com
t=0 0
m=audio 49230 RTP/AVP 0
a=rtpmap:0 PCMU/8000
a=sendrecv
m=video 0 RTP/AVP 31
a=rtpmap:31 H261/90000
m=message 0 TCP/MSRP *
a=accept-types:text/plain
a=path:msrp://alicepc.example.com:7780/iau39;tcp
```

FIG.7B

```
v=0
o=carol 2890844642 2890844646 IN IP4 host3.anywhere.com
s=
c=IN IP4 host3.anywhere.com
t=0 0
m=audio 49230 RTP/AVP 0
a=rtpmap:0 PCMU/8000
m=video 0 RTP/AVP 31
a=rtpmap:31 H261/90000
m=message 7780 TCP/MSRP *
a=accept-types:text/plain
a=path:msrp://alicepc.example.com:7790/iau39;tcp
```

FIG.7C

```
v=0
  o=alice 2890844526 2890844526 IN IP4 host1.anywhere.com
s=
c=IN IP4 host1.anywhere.com
t=0 0
m=audio 49170 RTP/AVP 0
a=rtpmap:0 PCMU/8000
m=video 51372 RTP/AVP 31
a=rtpmap:31 H261/90000
m=message 7770 TCP/MSRP *
a=accept-types:text/plain
a=path:msrp://alicepc.example.com:7770/iau39;tcp
```

FIG.8A

```
v=0
o=bob 2890844612 2890844616 IN IP4 host2.anywhere.com
s=
c=IN IP4 host2.anywhere.com
t=0 0
m=audio 49230 RTP/AVP 0
a=rtpmap:0 PCMU/8000
a=sendrecv
m=video 51382 RTP/AVP 31
a=rtpmap:31 H261/90000
a=inactive
m=message 7780 TCP/MSRP *
a=accept-types:text/plain
a=path:msrp://alicepc.example.com:7780/iau39;tcp
a=inactive
```

FIG.8B

```
v=0
o=carol 2890844642 2890844646 IN IP4 host3.anywhere.com
s=
c=IN IP4 host3.anywhere.com
t=0 0
m=audio 49230 RTP/AVP 0
a=rtpmap:0 PCMU/8000
a=sendrecv
m=video 51382 RTP/AVP 31
a=rtpmap:31 H261/90000
a=inactive
m=message 7780 TCP/MSRP *
a=accept-types:text/plain
a=path:msrp://alicepc.example.com:7790/iau39;tcp
a=sendrecv
```

FIG.8C

SYSTEM FOR ESTABLISHING AND MANAGING MULTIMEDIA POC SESSION FOR PERFORMING MULTIMEDIA CALL SERVICE, METHOD THEREOF AND USER EQUIPMENT THEREFOR

PRIORITY

This application is a Continuation of U.S. application Ser. No. 11/866,135, which was filed in the U.S. Patent and Trademark Office on Oct. 2, 2007, and claims priority under 35 U.S.C. §119(a) to a Patent Application filed in the Korean Intellectual Property Office on Oct. 2, 2006 and Oct. 17, 2006 and assigned Serial Nos. 2006-97398 and 2006-101076, the contents of which are incorporated herein by reference.

BACKGROUND OF THE INVENTION

1. Field of the Invention

The present invention relates generally to a system for establishing and managing a multimedia Push To Talk (PTT) over Cellular (PoC) session for performing a multimedia call service, a method thereof, and a User Equipment (UE) therefor, and in particular, to a system for establishing a PoC session supporting only media types supported by at least one receivable PoC client in the PoC session when various media types supported by PoC clients are not common in PoC session establishment or when transportable media types contained in a first response message are different from media types provided by a sender, a method thereof, and a UE therefor.

2. Description of the Related Art

The significant development of mobile communication and the spread of communication networks have contributed to various extra services and applications using a cellular phone. At the same time, demand among cellular phone users for various extra services, such as a positioning service, a multimedia service, and a Push-To-Talk (PTT) service, is increasing. Among these extra services, the PTT service supports various supplementary functions such as an instant messenger function and a status display function, as well as a group call and a voice call which are also provided by an existing radio or a Trunked Radio System (TRS).

Currently, standardization of a PTT-over-Cellular (PoC) service which employs the PTT function in a mobile communication network is actively being developed. One unique feature of the PoC service, which is distinguished from existing mobile communication services, is that a user can participate in a plurality of PoC sessions and can move among the PoC sessions to use a call service. A requirement that the user can move among the plurality of PoC sessions to use the call service is specified in the Open Mobile Alliance (OMA) which is a forum for specifying mobile communications services.

Meanwhile, a PoC V 2.0 system supports a PoC multimedia call service. In order to support the PoC multimedia call service, the PoC V 2.0 system defines video, images, and text as new multimedia types as well as sound.

Current PoC systems can display multiple streams, such as video and/or images, due to performance improvement of User Equipments (UEs).

As described above, if the PoC V 2.0 system uses a conventional PoC V 1.0 session establishment method and system, various multimedia services supported by the PoC V 2.0 system may be limited, and a session establishment time takes long.

SUMMARY OF THE INVENTION

An aspect of the present invention is to substantially solve at least the above problems and/or disadvantages and to provide at least the advantages below. Accordingly, an aspect of the present invention is to provide a system for establishing a Push To Talk (PTT) over Cellular (PoC) session supporting only media types supported by at least one reception PoC client in the PoC session when PoC clients performing a PoC multimedia call service support a plurality of media types and media types supported by the PoC clients are not common or when transportable media types contained in a first response message are different from media types provided by a sender, a method thereof, and a User Equipment (UE) therefor.

Another aspect of the present invention is to provide a system for managing a session by automatically updating information that is to be changed when a new media type is supported by a new participant or when a recipient of an existing media type is changed, a method thereof, and a UE therefor.

A further aspect of the present invention is to provide a system for storing attributes of media types contained in a session participation request (INVITE) message received from a session establishment client and updating a session to provide the stored media attributes in the updated session when a new participant supporting the media types and the media attributes provided in the INVITE message participates in the session after the session is established in response to a first response, a method thereof, and a UE therefor.

According to one aspect of the present invention, there is provided a Push To Talk (PTT) over Cellular (PoC) system for establishing and managing a multimedia PoC session for performing a multimedia call service, the PoC system including a session establishment request PoC client for transmitting a session participation request (INVITE) message containing media type and media attribute information to a PoC server; and the PoC server for storing the media type and media attribute information contained in the INVITE message, and if a first response message is received, transmitting a response message, which indicates that media types contained in the first response message are in a transportable state, to the session establishment request PoC client in order to establish a PoC session supporting only the media types set for media transmission in the first response message.

According to another aspect of the present invention, there is provided a method of establishing and managing a multimedia Push To Talk (PTT) over Cellular (PoC) session for performing a multimedia call service in a PoC system including a session establishment request PoC client, at least one session participation PoC client, and a PoC server for establishing and managing the multimedia PoC session, the method including a first process, wherein the session establishment request PoC client transmits a session participation request (INVITE) message containing media type and media attribute information to the PoC server; a second process, wherein the PoC server stores the media type and media attribute information contained in the INVITE message; and a third process, wherein if a first response message is received, the PoC server establishes a PoC session by transmitting a response message, which indicates that media types contained in the first response message are in a transportable state, to the session establishment request PoC client.

According to another aspect of the present invention, there is provided a User Equipment (UE) for establishing and managing a multimedia Push To Talk (PTT) over Cellular (PoC) session for performing a multimedia call service in a PoC system, the UE including a data transmitter for performing transmission and reception of packet data with a PoC server; and a controller for controlling the data transmitter to transmit a session participation request (INVITE) message containing media type and media attribute information required for session establishment, and if a re-INVITE message containing specific media type information supported in a current session is received, to transmit a response message in response to the re-INVITE message.

Preferably, the PoC system may include a session establishment request PoC client for transmitting an INVITE message; the PoC server for receiving the INVITE message from the session establishment request PoC client and transmitting a response message to the session establishment request PoC client in response to the INVITE message; and a temporary session media type and attribute storage unit for storing the response message containing media type information.

Preferably, the media type information may be noticed in the form of adding a new column for the media type information to a body portion of a Session Initiation Protocol (SIP) INVITE message and a SIP 200 'OK' message or a Real-time Transport Control Protocol (RTCP) message format.

The present invention suggests a session management system in a PoC system for establishing a PoC session supporting only media types supported by at least one reception PoC client (i.e., the number of PoC clients which can transmit and receive the media types is 2 or more) in the PoC session when a PoC client performing an Open Mobile Alliance (OMA) PoC multimedia call service establishes the PoC session and media types supported by PoC clients are not common or when transportable media types contained in a first response message are different from media types provided by a sender, and for adding or removing only media types supported by at least one reception PoC client by means of a session update when an arbitrary participant in the PoC session ends the PoC session or a new participant participates in the PoC session, a method thereof, and a UE therefor.

BRIEF DESCRIPTION OF THE DRAWINGS

The above and other objects, features and advantages of the present invention will become more apparent from the following detailed description when taken in conjunction with the accompanying drawing in which:

FIGS. 7 and 8 illustrate a Session Description Protocol (SDP) offer contained in an INVITE message when a PoC session is established and a SDP offer contained in an UPDATE or re-INVITE message according to an exemplary embodiment of the present invention.

DETAILED DESCRIPTION OF THE PREFERRED EMBODIMENT

Preferred embodiments of the present invention will be described herein below with reference to the accompanying drawings.

Hereinafter, there is described a case of applying the present invention to a Push To Talk (PTT) system, in particular, a PTT over Cellular (PoC) system providing a PTT service using a cellular mobile communication network.

In general, the PoC system uses a Session Initiation Protocol (SIP) and a SIP extension protocol in order to transfer session participation information of a group PoC call, and an eXtensible Markup Language (XML) Configuration Access Protocol (XCAP) in order to obtain group information. The functionality of the present invention described below can be implemented using the above-described protocols, and the basic construction of the present invention can be based on a PoC Rel.1 system.

A configuration of a general PoC system to which the present invention can be applied will now be described.

Figure 1:
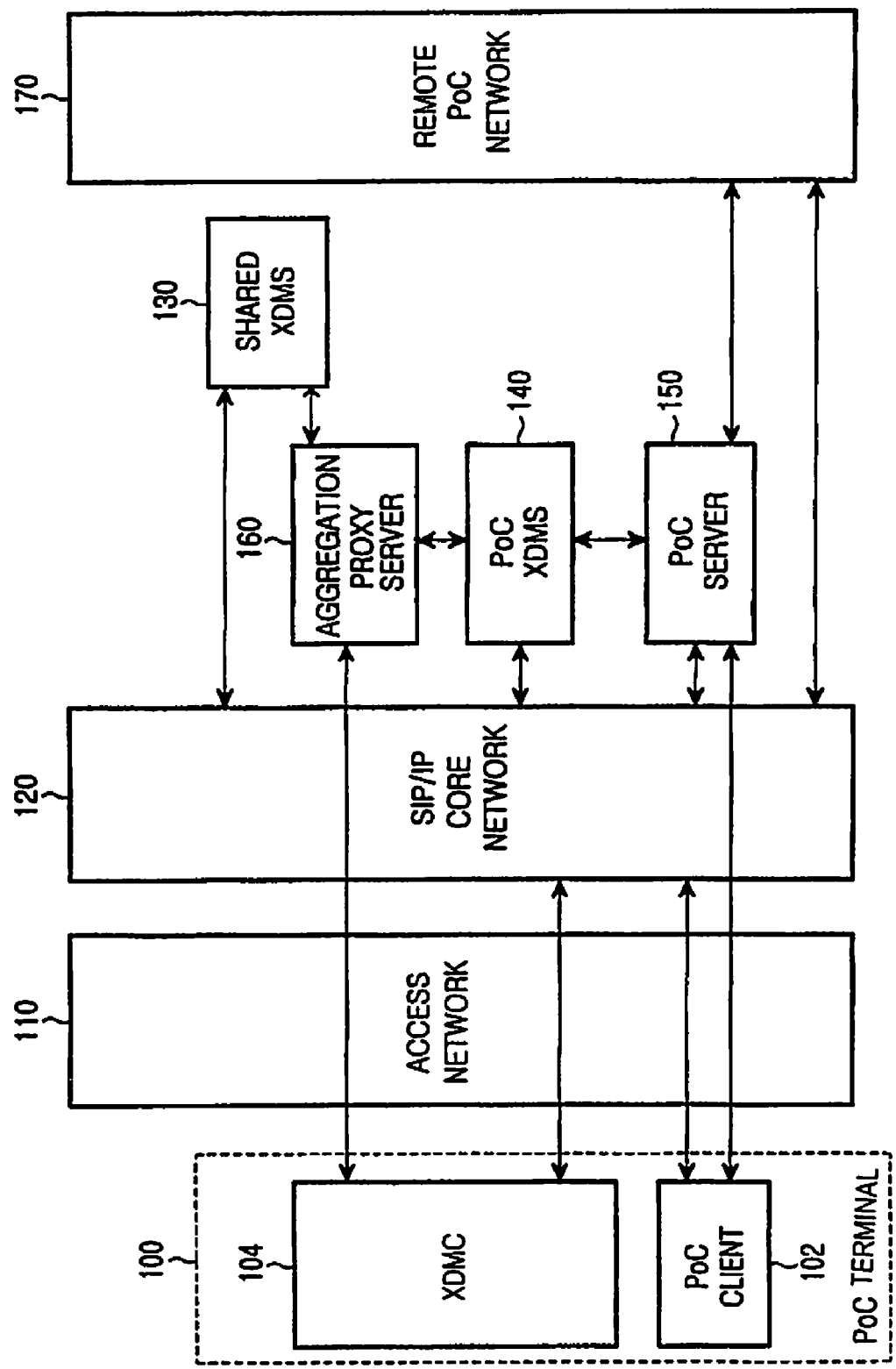
FIG. 1 is a schematic diagram of a typical Push To Talk (PTT) over Cellular (PoC) system.

FIG. 1 is a conceptual diagram of a typical PoC system and a relevant network structure.

Referring to FIG. 1, the typical PoC system may include a PoC terminal 100, eXtensible Markup Language (XML) Document Management Servers (XDMSs) 130 and 140, and a PoC server 150. The PoC system may further include an aggregation proxy server 160. These components may be connected via an access network 110, a Session Initiation Protocol/Internet Protocol (SIP/IP) core network 120, and a remote PoC network 170.

The components described above will now be described.

The PoC terminal 100 may include a PoC client 102 and an eXtensible Markup Language (XML) Document Management Client (XDMC) 104.

The PoC client 102 is a service requester employed in the PoC terminal 100 and resides in the PoC terminal 100 to perform a network access for providing a PoC service to a PoC service subscriber. The PoC service subscriber can receive the PoC service through the PoC terminal 100 in which the PoC client 102 is disposed. Hereinafter, the terminology 'PoC client' is used as a PoC UE in which a PoC client is disposed and a PoC service subscriber. In addition, unless otherwise stated, the reference numeral of the PoC client will be omitted.

The PoC client mainly serves on the side of a PoC service subscriber, i.e. a PoC user, to establish a PoC session, participate in an existing PoC session, or terminate the established PoC session. In addition, the PoC client performs a function of generating and transferring a talk burst, a function of supporting an instant personal alert, and an authentication function required when the PoC client accesses the PoC service. The PoC client can be connected to the SIP/IP core network 120, which is a SIP/IP multimedia support core network, via the access network 110.

The SIP/IP core network 120 is connected to the PoC server 150 and the XDMSs 130 and 140 in order to support the PoC service. In this case, the PoC server 150 can perform a Controlling PoC Function (CF) for maintaining and managing a PoC session, or a Participating PoC Function for participating in a PoC session established for a one-to-one PoC call or a one-to-many PoC call.

Meanwhile, the PoC service can include a service of establishing a group session, such as a conference call. For the group session establishment service, an Open Mobile Alliance (OMA) standard defines the XDMC 104 and the XDMSs 130 and 140 for a group list service. FIG. 1 illustrates the PoC XDMS 140 used for the PoC service and the public XDMS 130 which can be commonly used for another service enabler. Information regarding a group and group members can be input to the XDMSs 130 and 140 through the PoC client. The PoC client can obtain information regarding PoC clients which can be called using an individual or group list transmitted from the XDMSs 130 and 140. Creation, modification, and management of a group or group members in the XDMSs 130 and 140 may be achieved through a reliable communication network, such as the Internet or intranet, which a PoC service provider can trust. Detailed description of a protocol of XML document management to create, modify, and erase a group list is omitted.

When a group list related request for a group service is received from the XDMC 104, the aggregation proxy server 160 routes the group list related request to the XDMSs 130 and 140 according to an appropriate rule.

The PoC server 150 will now be described with reference to FIG. 2.

Figure 2:
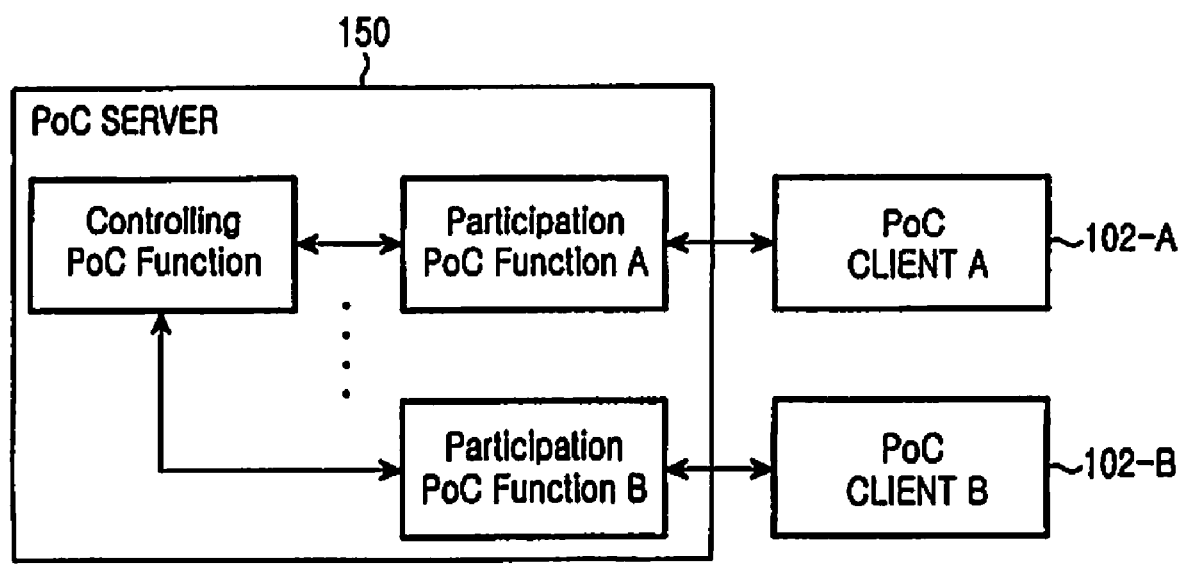
FIG. 2 is a block diagram of a typical PoC server.

FIG. 2 is a block diagram of a typical PoC server.

The PoC server can be classified into a Controlling PoC Function (CF) for generally maintaining and managing a PoC session and a Participating PoC Function (PF) for managing sessions. Functional characteristics of the PoC server will be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized changing report
May provide transcoding between different codecs
Support Talk Burst Control Protocol Negotiation As shown in Table 1, the CF serves to generally manage a PoC session among functions of the PoC server. The PoC server receives requests for a floor (right to talk) from PoC clients, arranges an order in which to give the clients the floor, and gives the clients the floor in that order. The PoC server also distributes a talk burst from a specific PoC client to all PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client requests the floor or when the CF gives the floor to the PoC client. In addition, the PF serves to relay media between the CF and the PoC client, provide transcoding between different codecs, and provide a filtering function for filtering one of two PoC sessions chosen by a user when there is simultaneous talking in two simultaneous PoC sessions.

TABLE 2

Participating PoC Function (PF)

Provides PoC session handling
May provide the Media relay function between PoC Client and Controlling PoC server
May provide user media adaptation procedures
May provide the Talk Burst control message relay function between PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 is a block diagram for schematically describing a CF and PFs of a PoC server.

Figure 3:
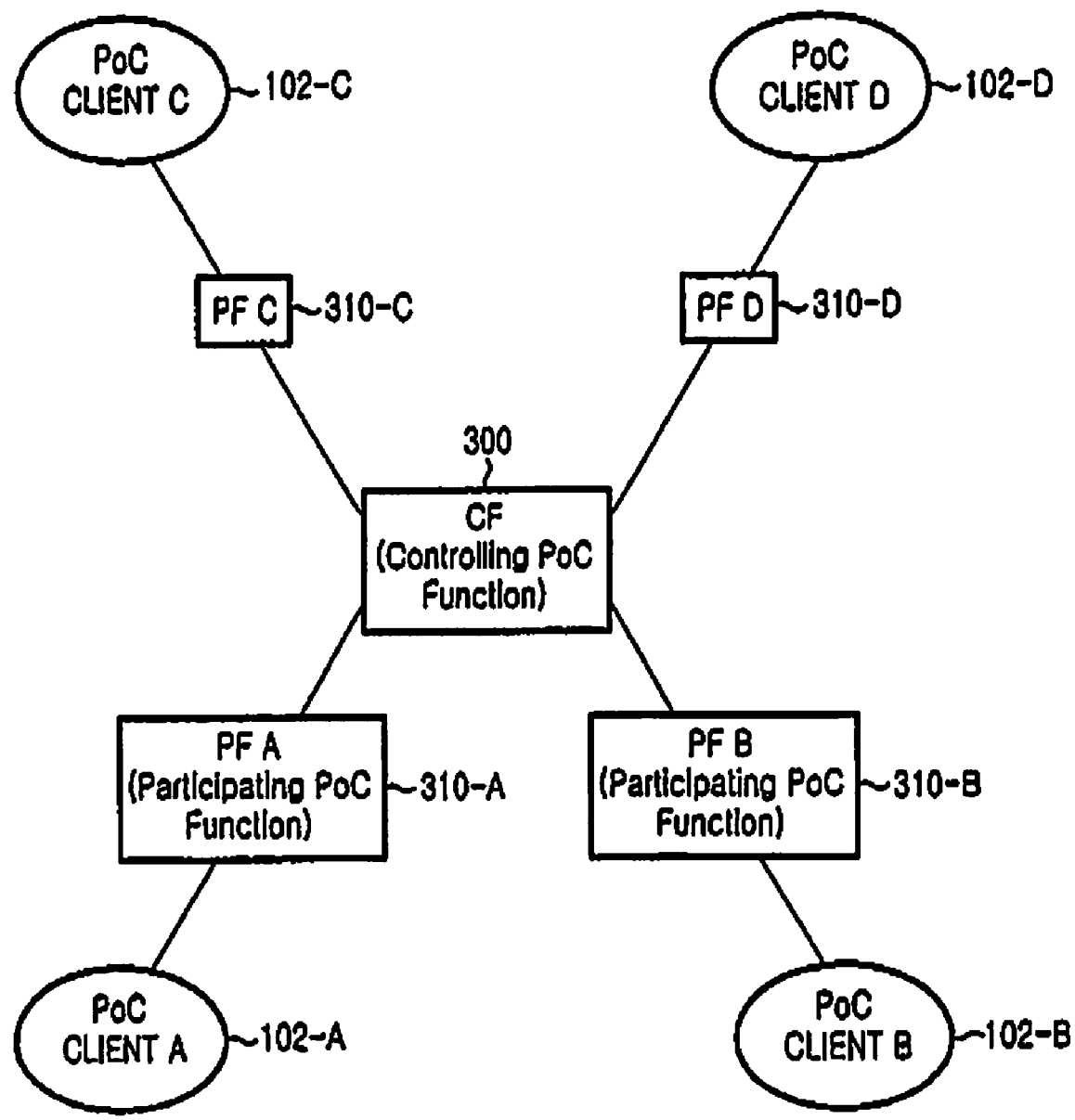
FIG. 3 is a block diagram for describing a Controlling PoC Function (CF) and Participating PoC Function (PFs) of a PoC server.

Referring to FIG. 3, PoC clients 102-A through 102-D provide access to a CF 300 through PFs 310-A through 310-D, respectively, thereby establishing a PoC session. Here, when a floor is given to a PoC client qualified as a talker from the CF 300, media based on the talker-qualified PoC client is transmitted to each PoC client. In this case, the PoC client qualified as a talker can talk only after confirming information regarding PoC clients participating in a group session.

In a PoC system, a call processing technique for a call connection allows various procedures according to requests and states of a sender and a recipient. Features of a PoC system requested by the OMA according to settings of a sender and a recipient will now be described.

First, the recipient can set a response mode thereof according to a request of a PoC client, wherein the response mode is classified into an auto-answer mode and a manual response mode. In the auto-answer mode, if corresponding information is included in a PoC client list designated by the recipient, a corresponding network transmits an immediate response to the sender instead of a manual response of the recipient. The network transmits an automatic response instead of an operation of a PoC UE since the PoC server stores the response mode and an auto-answer user list according to a response mode-setting request of the PoC UE. The manual response mode corresponds to a case where the sender is not included in an auto-answer user list or it is unclear whether the sender is included in the auto-answer user list, or a case where the recipient has set a manual response for all users. A PoC call request is transmitted to a PoC UE via a reception network, and a call is connected by acceptance of a PoC client.

Second, the PoC system can be in an on-demand session mode or a pre-established session mode according to whether a PoC client has set a connection with a PoC server belonging to its own home network. The pre-established session mode indicates that the PoC client sets a session between the PoC client and the PoC server belonging to the home network, in advance, according to a request of the PoC client. The pre-established session mode is required for the PoC client to quickly establish a session without re-negotiating with the PoC server media parameters that are to be used in the future by negotiating the media parameters with the PoC server in advance.

The pre-established session is set in advance by the PoC client providing media parameters supported to a main text portion, i.e., a Session Description Protocol Multipurpose Internet Mail Extensions (SDP MIME) body, providing media parameters provided by the PoC server, and responding to the media parameters provided by the PoC server using a SIP INVITE method. In this case, identification information of the pre-established session containing a conference Uniform Resource Identifier (URI), which is newly set in a response message received from the PoC server, is answered back to the PoC client.

If the pre-established session is used, an Internet Protocol (IP) address, a port number, a codec that is to be used, and a talk burst control protocol can be negotiated in advance. The on-demand session mode indicates a state where the PoC client has not established a session in advance, indicates a state where another PoC client has not established a session in advance, and indicates that the PoC client performs a PoC call connection procedure after receiving an INVITE message from another PoC client.

Settings of the response mode, in response to a call request in the PoC system, can be stored in both the PoC server, which is an element of a network, and the PoC client, which is a UE in the side of a user.

When the response mode is set in the home network managing the PoC client, the response mode is set in the PoC server acting as a PF in the home network to which the PoC client belongs.

In this case, if a PoC call is requested from another PoC server, the PF automatically responds with a session proceeding message to a call request network without delay. Thus, when the auto-answer mode is set, a call request procedure is simplified, compared to a case where a session setup message is transmitted to the PoC client and the PoC client responds, resulting in a decrease of an initial floor granting time.

However, since a result that is different from a response desired by the user may occur according to a situation when the auto-answer mode is set in the home network, the response mode can be set in the PoC client. In this case, the response mode set in the PoC client has higher priority than that of the response mode set in the home network. This solves a privacy problem occurring in a case where the response mode is not reflected in real-time due to a signal delay or error in the network when the PoC client changes the response mode of the PoC client and requests the PoC server for a response mode change.

In brief, in the PoC service, although the response mode of a user can be set by either a PoC server or a PoC client, the response mode is determined by the PoC client in which a latest desire of the user is reflected, and a media stream (voice or video of the user) is transmitted based on the determination.

A process of establishing a PoC multimedia session in a PoC system having the features described above will now be described.

An originating PoC client requests to process a call by transmitting a multimedia session participation request message (multimedia can include various formats of audio, video, and text according to selection of a media type) using the SIP. In response to the call-processing request, a target PoC client variously responds according to which response mode is set in a corresponding PoC server and whether there is an existing session. A call processing process for a PoC call will now be described by describing procedures in an originating network and a target network.

The originating PoC client transmits a SIP session participation request (INVITE) message containing SIP address information of the target PoC client to a corresponding SIP/IP core network. The SIP INVITE message may further include elements such as PoC address information of the originating PoC client, required media parameters, feature value information that informs of the PoC service, etc. If a required session corresponds to multimedia, the "required media parameters" may include various feature values such as an encoding method of audio and video, a bit rate, a payload type, etc.

The SIP INVITE message is transmitted to a participating PoC server (PF) via a corresponding IP Multimedia Subsystem (IMS) server in an IMS network, i.e., a Primary Constrained Shortest Path First (P-CSPF) and a Secondary CSPF (S-CSPF), by means of a path query in a Dynamic Host Configuration Protocol (DHCP) server or a Domain Name Server (DNS). If a typical call is requested, since a participating PoC server to which a PoC client is connected can be separately implemented from a controlling PoC server managing a talk burst of an established session, the SIP INVITE message transmitted to a PF is transferred to the controlling PoC server (CF) via a corresponding SIP/IP core network.

A PoC session control network including the CF transmits the SIP INVITE message to the target network and receives a response message from the target network. A SIP message responded from the target network may be a provisional response message represented by '1xx', a successful response message represented by '2xx', or an error response message represented by '4xx' through to '6xx'. In the auto-answer mode, a SIP 183 'session progress' signal may be received as a response message, and a connection between a PoC server and a PoC client in an IMS network of a call requester can be performed by using this response message. A call acceptance signal of the target PoC client is transmitted as a SIP 183 'session progress' signal or SIP 200 'OK' response and is transmitted to the originating PoC client via the PoC server including the CF and PFs. If the 200 'OK' response or 183 'session progress' signal is received from a target PoC server, the CF determines that a PoC call is connected and transmits a 'floor granted' signal for granting a talk burst floor to the originating PoC client. The granting of the talk burst floor according to the 200 'OK' response or 183 'session progress' signal can be identified by 'confirmed' or 'unconfirmed'. If an 'unconfirmed' response is received, the CF needs a buffering function.

After receiving the response signal responding to the SIP INVITE message, the originating PoC client transmits a talk burst and receives a 'floor granted' signal for transferring a signal (e.g., a call connection sound) using a Real-time Transport Control Protocol (RTCP). The 'floor granted' signal is generated by the CF having a talk burst arbitration right and transmitted to a PoC client via a PF managing the PoC client. Since the 'floor granted' signal uses a Bearer's path instead of the SIP, the 'floor granted' signal can be transmitted without using the SIP/IP core network, such as using the IMS network as alternative. The originating PoC client, which has received the call connection sound, transmits a media stream (e.g., a sound stream) using a Real-time Transport Protocol (RTP).

Hereinafter, in order for those skilled in the art to easily implement the present invention, exemplary embodiments of the present invention will now be described in detail with reference to the accompanying drawings.

The present invention relates to a session management system for establishing a PoC session between an originating PoC server, which transmits an RTP media limited to media types responded to by a first responded client in a PoC multimedia environment, and a PoC server adding or removing only media types supported by at least one target PoC client through a session update in the PoC session, a method thereof, and a UE therefor.

Figure 4:
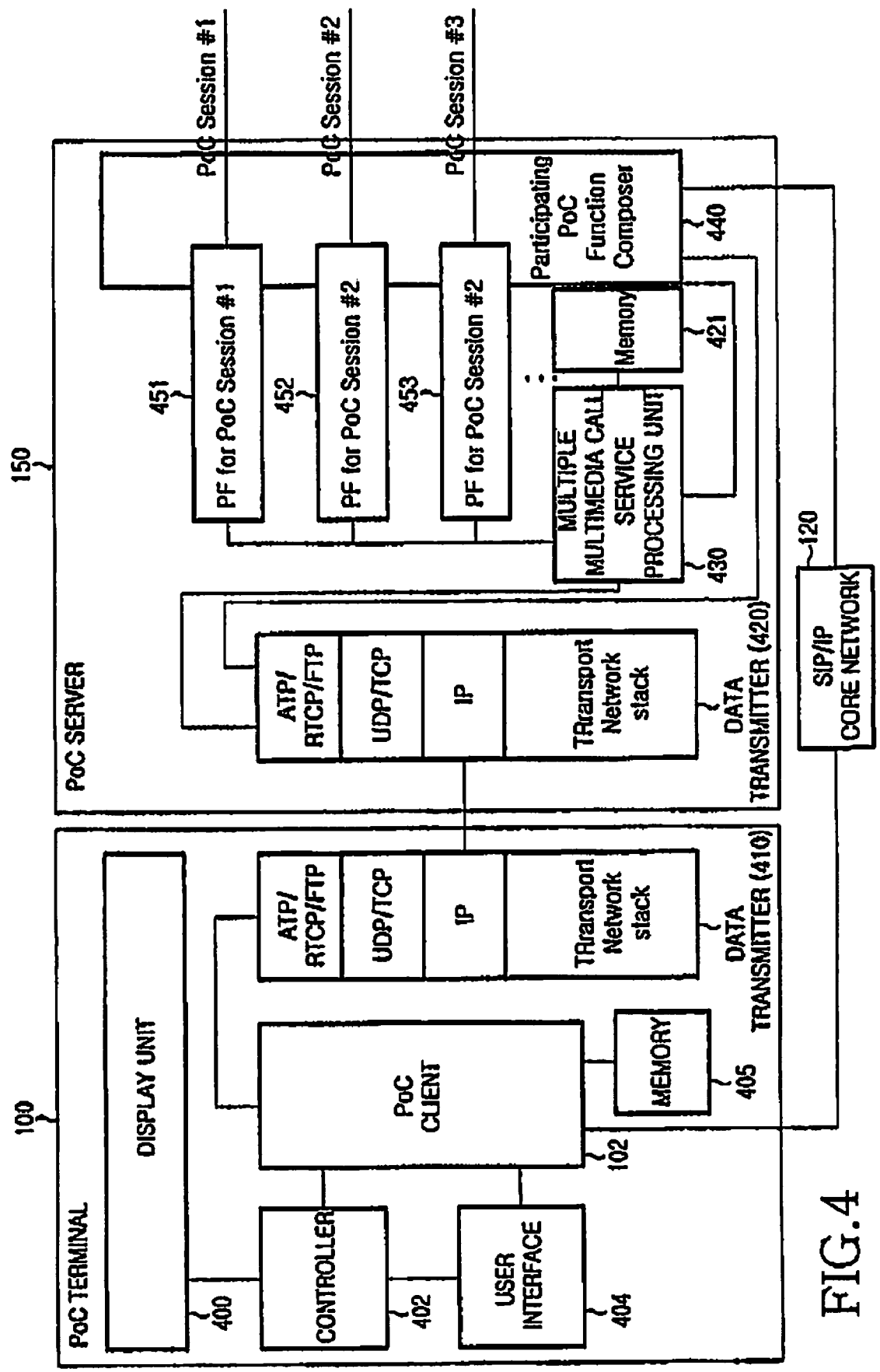
FIG. 4 is a block diagram of a PoC server and a PoC User Equipment (UE) including a PoC client, which are connected to each other, according to an exemplary embodiment of the present invention.

Configurations of a PoC client and a PoC server constituting a PoC system for establishing a PoC session supporting only media types supported by at least one receivable PoC client in the PoC session when various media types supported by PoC clients in the PoC session establishment are not common or when transportable media types contained in a first response message are different from media types provided by a sender will now be described with reference to FIG. 4. FIG. 4 is a block diagram of a PoC server 150 and a PoC terminal 100 including a PoC client 102, which are connected to each other, according to an exemplary embodiment of the present invention.

Referring to FIG. 4, the PoC terminal 100 is a device for interfacing with a user and includes a user interface 404 for outputting key input data unique to each key input. The PoC terminal 100 also includes a data transmitter 410, which can be constituted of a protocol stack, for performing packet data communication with the PoC server 150. The PoC terminal 100 also includes a display unit 400 for displaying media data received by the data transmitter 410 and displaying data output from the user interface 404. The PoC terminal 100 also includes a controller 402. The controller 402 controls data transmission and reception of the PoC client 102, displaying of the display unit 400, creation of an invite reservation message for participating in a chat PoC group, transmission of the invite reservation message, and reception of a response message. In particular, if the PoC client 102 is a session establishment PoC client, the controller 402 transmits a session participation request (INVITE) message, which contains media type and media attribute information required by a user for session establishment, to the PoC server 150. If a re-INVITE message containing specific media type information supported by a current session is received from the PoC server 150, the controller 402 transmits a response message to the PoC server 150 in response to the re-INVITE message. Meanwhile, if the PoC client 102 is a session participation PoC client, when the controller 402 receives an INVITE message, the controller 402 transmits a response message containing supportable media type information to the PoC server 150 in response to the INVITE message.

The PoC terminal 100 also includes a memory 405 for storing information regarding general functions of the PoC terminal 100, a user account for identifying data and UE related to the PoC service, and information set by the user or provided from the PoC server 150. In particular, the memory 405 also stores information on supportable media types contained in a first received response message.

The PoC server 150 includes a data transmitter 420 which can be constituted of a protocol stack, a multiple multimedia call service processing unit 430, a memory 421, and a Participating PoC Function (PF) composer 440. An operation of the PoC server 150 will now be described in detail with reference to FIG. 5.

Figure 5:
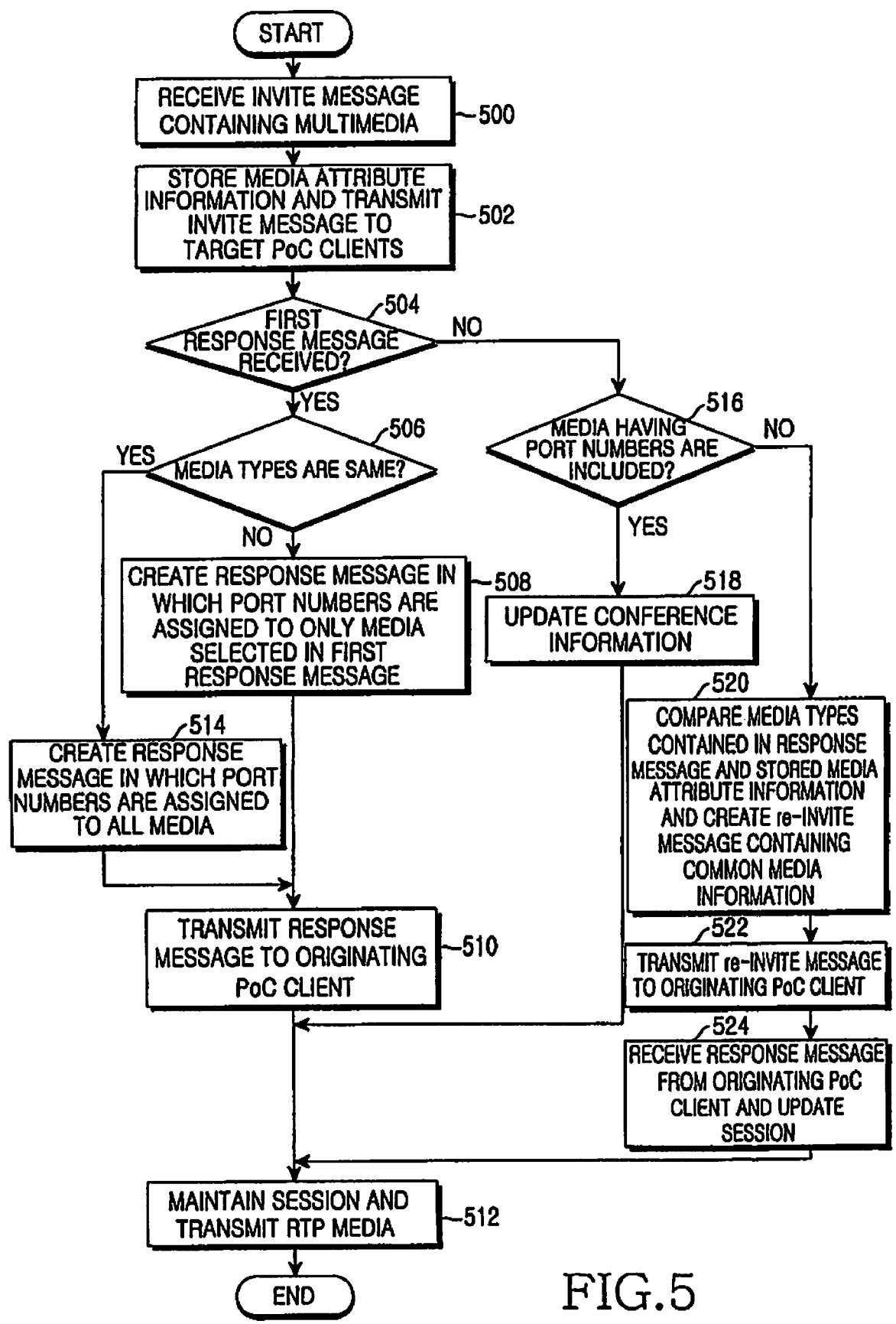
FIG. 5 is a flowchart of a process of establishing a multimedia PoC session when a conference PoC server receives a session participation request (INVITE) message for requesting various media types according to an exemplary embodiment of the present invention.

FIG. 5 is a flowchart of a process of establishing a multimedia PoC session in a PoC server performing the Controlling PoC Function (CF) in order to establish the multimedia PoC session supporting various media types between a PoC client and the CF according to an exemplary embodiment of the present invention.

Referring to FIG. 5, when the CF receives an INVITE message, in step 500, the CF caches media attribute information contained in the INVITE message in the additional memory 421 and transmits the INVITE message to target PoC clients in step 502.

The CF determines, in step 504, whether a received response message is a first response message in response to the INVITE message. If it is determined, in step 504, that the received response message is a first response message, the CF determines, in step 506, whether media types supported by a session participation PoC client, which is contained in the first response message, are the same as media types contained in the INVITE message. If it is determined, in step 506, that the media types are all the same, the CF creates a 200 'OK' response message for assigning a User Datagram Protocol (UDP) port number to each of all media and activating the media, in step 514. Thereafter, the CF transmits the 200 'OK' response message to an originating PoC client, i.e. a session establishment request PoC client, in step 510. However, if it is determined, in step 506, that the media types are not the same, the CF creates a 200 'OK' response message for assigning a UDP port number to only each of media types supported by the session participation PoC client, which are contained in the first response message, and activating the media, in step 508. The UDP is defined in Request For Comments (RFC) 768 and is used as a Continuous Media Transport Protocol (CMTP). Thereafter, the CF transmits the 200 'OK' response message to the originating PoC client, i.e. the session establishment request PoC client, in step 510.

If it is determined, in step 504, that the received response message is not a first response message, the CF determines, in step 516, whether media to which a UDP port is assigned are contained in the received response message. If it is determined, in step 516, that a media type having an assigned port number and being activated is contained in the received response message, the CF updates only SIP URI information of a corresponding target PoC client as conference information, in step 518. Thereafter, the CF maintains the session and transmits received RTP media, in step 512. If it is determined, in step 516, that no media type having an assigned port number and being activated is contained in the received response message, i.e., for media to which a UDP port number is not assigned, the CF creates a re-INVITE message containing common media type information obtained by comparing media types contained in the received response message and the stored media attribute information, in step 520. The CF transmits the re-INVITE message to the originating PoC client, in step 522. The CF receives a response message from the originating PoC client and updates the session, in step 524. Thereafter, the CF maintains the session and transmits received RTP media, in step 512.

Figure 6:
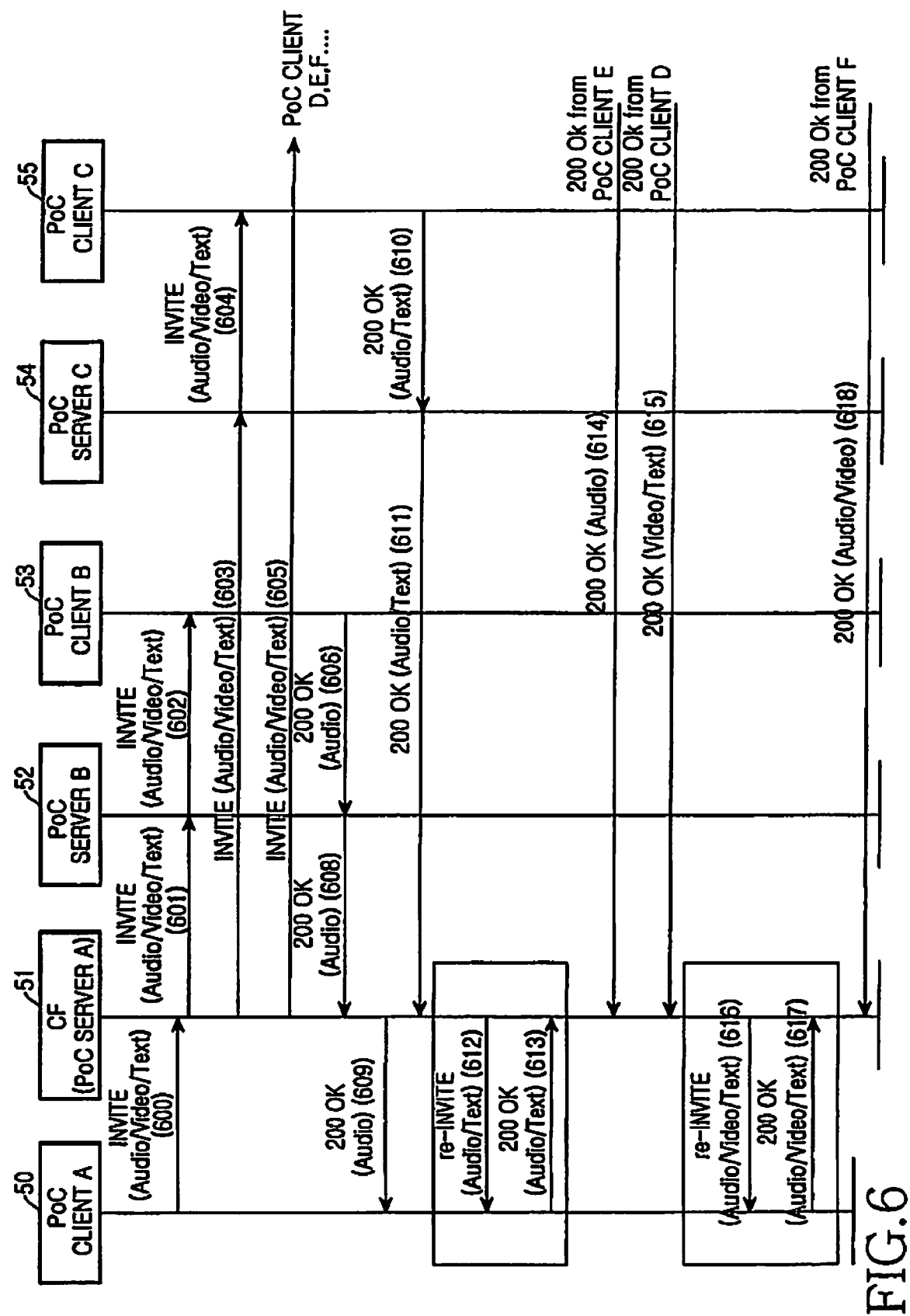
FIG. 6 is a signaling diagram between a PoC client and a PoC server for efficiently establishing and managing a PoC session between PoC clients supporting various media types according to an exemplary embodiment of the present invention.

FIG. 6 is a signaling diagram between a PoC client and a PoC server for establishing and managing a multimedia PoC session supporting various media types between the PoC client and the PoC server for providing a PoC multimedia service according to the present invention. In particular, although FIG. 6 shows an embodiment for establishing an ad-hoc group session, the current embodiment can be applied to a pre-arranged group according to the same principle suggested in the specification.

Referring to FIG. 6, if a PoC client A 50 desiring to establish a PoC session transmits an INVITE message to a CF 51, in step 600, the CF 51, which has received the INVITE message, transmits the INVITE message to target PoC clients invited to the PoC session, in steps 601 through 605. The INVITE message transmitted from the session establishment request PoC client A 50 contains media types required by the PoC client A 50 and address information of the target PoC clients in a body portion of the INVITE message. It is assumed in the current embodiment illustrated in FIG. 6 that the media types required by the PoC client A 50, which are contained in the INVITE message, are audio, video, and text. The CF 51 caches information, such as RTP media-mapping information, which is detailed media attribute information of the media types contained in the INVITE message transmitted from the PoC client A 50, codec mode information, and coding rate information, in the additional memory 421.

Each target PoC client, which has received the INVITE message from the CF 51, transmits a response message containing supportable media type information to the CF 51. It is assumed in the current embodiment illustrated in FIG. 6 that a media type supported by a PoC client B 53 is an audio type, media types supported by a PoC client C 55 are audio and text types, media types supported by a PoC client D are the video and text types, and a media type supported by a PoC client E is the audio type.

If a first SIP 200 'OK' response message is received from the PoC client B 53 via a PoC server B 52 in response to the INVITE message, in steps 606 and 608, the CF 51 analyzes the media type supported by the PoC client B 53, which is contained in the first SIP 200 'OK' response message. The CF compares the media type supported by the PoC client B 53, which is contained in the first SIP 200 'OK' response message, and the media types stored in the memory 421. In the current embodiment illustrated in FIG. 6, since the media types required by the PoC client A 50 are the audio, video, and text types and the media type supported by the PoC client B 53 is the audio type, this comparison result corresponds to an unequal case. In this case, the CF 51 creates a 200 'OK' response message for assigning a UDP port number to only the audio type supported by the PoC client B 53, which is contained in the first SIP 200 'OK' response message, and activates media transmission (here, UDP port numbers may be assigned to all media types initially suggested according to an exemplary embodiment of the present invention). The CF transmits the 200 'OK' response message to the PoC client A 50, in step 609. The CF stores the initially provided media types, i.e. audio, video, and text types, and media attribute information and a first responded media type, i.e. the audio type, as unique conference information so that a session update is performed in the future according to a media type feature in a response message.

If media types supported by the PoC client B 53 are the same as the media types stored in the memory 421, the CF 51 creates a 200 'OK' response message for assigning UDP port numbers to all the media and activating the media. Thereafter, the CF transmits the 200 'OK' response message to the PoC client A 50.

Meanwhile, if a second response message is received from the PoC client C 55 in steps 610 and 611, the CF 51 determines the media types supported by the PoC client C 55 by analyzing a message body contained in the 200 'OK' response message transmitted from the PoC client C 55. As described above, since the media types supported by the PoC client C 55 are the audio and text types, the second response message is a response message supporting the audio and text types. In this case, the CF 51 performs a session update to transmit text besides audio between the PoC client A 50 and the CF 51 by reading the conference information stored in the memory 421. In order to update to a session for transmitting audio and text, the CF 51 creates a re-INVITE message containing audio and text type information and transmits the re-INVITE message to the PoC client A 50, in step 612. When the CF 51 receives a response message from the PoC client A 50, in step 613, the CF 51 updates the session.

Thereafter, the CF 51 maintains the session and transmits received RTP media.

In addition, the CF 51 updates the stored conference information according to the session update response, in step 613, in order to support text. The session update uses the re-INVITE message that is created using attribute information of text from among the stored media attribute information. A body portion of the re-INVITE message will be described in detail with reference to FIG. 6C later.

If 200 'OK' response messages are received from other PoC clients, i.e. the PoC client E and the PoC client D, in steps 614 and 615, a body portion of each of the 200 'OK' response messages is analyzed, and if media type information contained in each 200 'OK' response message corresponds to the media types supported in the session between the PoC client A 50 and the CF 51, the session update is not performed, and only identity information of a corresponding PoC client is updated into the conference information. That is, according to the 200 'OK' response message received from the PoC client E, since the audio type that is a media type supported by the PoC client E is a media type supported in the session between the PoC client A 50 and the CF 51, a separate media type update is not performed. However, according to the 200 'OK' response message received from the PoC client D, since the video type among the media types supported by the PoC client D is a newly supported media type, a session update for transmitting the audio, text, and video types is performed, in steps 616 and 617, as in steps 612 and 613. As described above, a re-INVITE message is created using the stored attribute information of the video type and transmitted to the PoC client A 50, in step 616, and a 200 'OK' response message is received in response to the re-INVITE message, thereby updating to a session for supporting audio, video, and text.

Thereafter, even if the CF receives a 200 'OK' response message from a PoC client F, in step 618, since the audio and video types that are media types supported by the PoC client F correspond to the media types supported by the session between the PoC client A 50 and the CF 51, a separate media type update is not performed.

Detailed procedures of a Media Burst Control Protocol (MBCP) for managing an ACKnowledgement (ACK) signal and a floor are omitted in FIG. 6 for convenience of description. However, when an additional media update is performed as described above, a session is updated using a SIP message, and the PoC client A 50 transmits a media burst request message of media and receives a media burst granted message according to media types supported by the CF 51.

When another PoC client besides group members initially invited participates in a session, if media type and attribute information requested by the PoC client is different from media types existing in the session, the session participation of the PoC client can be rejected or accepted according to the policy of a service provider. If the session participation of the PoC client is accepted, a session re-INVITE message for updating the media type and attribute information, which is not used in the session, can be requested from all PoC clients participating in the session using the principle of the present invention. In this case, the session update is performed as illustrated in FIG. 6.

The session re-INVITE message may be transmitted using another SIP message for updating a session feature in the same purpose.

In order to describe the embodiment illustrated in FIG. 6 in detail, FIGS. 7 and 8 show only media type and attribute information from among a corresponding SIP message. FIGS. 7A, 7B, and 7C respectively illustrate media type information of an SDP body portion contained in an SIP message transmitted, in steps 600, 609, and 612 illustrated in FIG. 6. In step 609, the response message is in a state where only audio can be transmitted from among audio, video, and text suggested in FIG. 7A and other media types cannot be transmitted by setting UDP port numbers of the other media types to 0 as illustrated in FIG. 7B. Since text is additionally supported, in step 612, audio and text can be transmitted by assigning a UDP port number to text as illustrated in FIG. 7C. In step 616, media can be transmitted by assigning UDP port numbers to all media types.

FIGS. 8A, 8B, and 8C are another embodiment of FIGS. 7A, 7B, and 7C and respectively illustrate media type information of an SDP body portion contained in an SIP message transmitted, in steps 600, 609, and 612 illustrated in FIG. 6. In step 609, the response message is in a state where only audio can be transmitted from among audio, video, and text suggested in FIG. 8A and other media types cannot be transmitted by applying 'inactive', i.e., a media feature value indicating that corresponding media types cannot be transmitted, to the other media types as illustrated in FIG. 8B. Since text is additionally supported in step 612, the media feature value of 'inactive' is applied to only video as illustrated in FIG. 8C. In step 616, all media types can be transmitted by removing the media feature value of 'inactive' for all media types.

Alternatively, in a method of updating the media type and attribute information, which is not used in the session, an RTCP APP message, i.e. an MBCP message, can be transmitted. In response to a first response message, a session in which UDP port numbers are assigned to all media types initially suggested and media parameters (a codec, a floor management protocol, and an IP address) have been negotiated is established between the PoC client A 50 and the CF 51 in FIG. 6. That is, after the 200 'OK' message is received, in step 609, a partially activated session in which UDP port numbers and codec information of video and text are negotiated and a media feature value indicating whether corresponding media types can be transmitted is set as 'inactive' is established between the PoC client A 50 and the CF 51. Since the floor management protocol of the media types is also negotiated, port numbers and MIME parameters of the RTCP for transmitting an MBCP message of the media types. Thus, if the CF 51 receives a response message supporting any inactive media type from another PoC client through procedures similar to the description of FIG. 6, the CF 51 updates the partially activated session between the PoC client A 50 and the CF 51 by transmitting an MBCP message through the RTCP channel.

In this method, when a response message supporting a new media type is received after receiving the first response message, the CF 51 transmits an MBCP message for updating the transport feature value to the PoC client A 50, and thereafter, if an MBCP ACK is received, the CF 51 changes the media feature value indicating whether corresponding media types can be transmitted to 'sendrecv' for the new media type. The PoC client A 50 updates the session to also transmit the new media type by changing the media feature value of the new media type from 'inactive' to 'sendrecv' base on the MBCP message for a specific media type received from the CF 51 and responding an MBCP ACK message.

For example, according to this method, the re-INVITE message in steps 612 and 616 illustrated in FIG. 6 can be replaced by an MBCP message (e.g., an MBCP connect message), and text and video, which are inactive media types, are active by receiving an MBCP ACK message in steps 613 and 617. The terminology 'media type' used in the present invention is used as information for identifying media features, such as audio, video, images, and text. In addition, the terminology 'media type' can be dealt with a minimum basic unit for distinguishing the same media types from each other as an extended technique of the present invention. For example, if two different video, clips (first video and second video) exist, i.e., if the first video and the second video, clips which are the same media type, exist, the first video and the second video, clips can be considered as different media types according to characteristics of connected media parameters. Thus, the terminology 'media type' can be used to indicate the same media type or extended and used as the minimum basic unit for distinguishing media streams from each other.

Thus, as an embodiment of the extended technique, when an originating PoC client requests a session containing media types of first audio, second audio, first video, and first video to be established, a home PoC server can establish a PoC session for transmitting the initially suggested media types (first audio, second audio, first video, and first video) regardless of media types suggested in a SIP response message received from a target network.

As described above, according to the present invention, a PoC session can be established to support only media types supported by at least one target PoC client in the PoC session when PoC clients performing a multimedia call service supports a plurality of media types and media types supported by the PoC clients are not common.

In addition, if a new media type is provided by a newly participated PoC client, if a recipient of media types supported in an existing session is changed, a method of managing the session by updating the changes is provided, and thereby the session can be actively managed in response to the addition of the new media type or removal of an existing media type.

In addition, the present invention stores media type and media attribute information provided by a first PoC session establisher to reflect the updated contents in the corresponding session without additional procedure when the media type information needs to be updated later, thereby contributing to improvement in efficiency of wireless transmission and improvement in user experience of the PoC service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A server for establishing and managing a multimedia communication session for performing a multimedia call service, comprising:
   a data transceiver for performing transmission and reception of packet data with a session establishment request client and at least one of a session participation client;
   a memory for storing media attribute information and at least one media type contained in a session participation request message; and
   a session processing unit for controlling the reception of the session participation request message, to store media attribute information and at least one media type, to receive a first response message containing the at least one media type supported from the session participation client from the at least one of the session participation client, to transmit a response message to the session establishment request client for establishing the multimedia communication session supporting the transportable media types by comparing the at least one media type in the first response message and the at least one media type stored in the memory.

2. The server of claim 1, wherein the session processing unit compares the at least one media type contained in the first response message and the media type stored in the memory, and if the media types are the same, the server transmits a response message, which indicates that the at least one media type is in a transportable state, to the session establishment request client.

3. The server of claim 2, wherein the session processing unit inserts User Datagram Protocol (UDP) port numbers assigned to transportable media and a media feature value indicating that the corresponding at least one media type can be transmitted in the response message to the session establishment request client.

4. The server of claim 1, wherein the session processing unit compares the at least one media type contained in the first response message and the at least one media type stored in the memory, and if the at least one media type is not all the same, the server transmits a response message, which indicates that only the at least one media type contained in the first response message is in the transportable state, to the session establishment request client.

5. The server of claim 4, wherein the session processing unit inserts User Datagram Protocol (UDP) port numbers assigned to transportable media and a media feature value corresponding to the at least one media type can be transmitted in the response message to the session establishment request client.

6. The server of claim 1, wherein if a response message received in response to the session participation request message is not the first response message, and if the at least one media type contained in the response message is a portion of the at least one media type supported by a session established between the session establishment request client and the server, the session processing unit does not update the session.

7. The server of claim 1, wherein if a response message received in response to the session participation request message is not the first response message, and if the at least one media type contained in the response message is different from the at least one media type supported by a session established between the session establishment request client and the server, the session processing unit updates the session so that the at least one of the newly supported media type is in the transportable state.

8. The server of claim 7, wherein when the session processing unit updates the session so that the at least one of the newly supported media type is in the transportable state, the session processing unit performs the session update according to media attributes of the at least one of the stored media type.

9. The server of claim 7, wherein the session processing unit transmits the session participation request message containing UDP port numbers assigned to the at least one of the newly supported media type for the session update to the session establishment request client.

10. The server of claim 7, wherein when UDP port numbers are assigned to all the at least one media type in the initial session establishment, and when the session processing unit receives at least one newly supported media type and transmits a message for updating to a media feature value indicating that the at least one the media type can be transmitted, the message for updating is a Media Burst Control Protocol (MBCP) message using a Real-time Transport Control Protocol (RTCP) channel.

11. A method of establishing and managing a multimedia communication session for performing a multimedia session service in a server, comprising:
   receiving a session participation request message containing media attribute information and at least one media type from the session establishment request client;
   storing media attribute information and the at least one media type contained in the session participation request message in memory;
   transmitting the session participation request message for requesting a session participation to at least one session participation client;
   receiving a first response message from the at least one session participation client, wherein the first response message contains at least one media type supported from the session participation client;
   comparing the at least one media type in the first response message and the at least one media type stored in the memory; and
   transmitting a response message to the session establishment request client for establishing the multimedia communication session supporting the at least one transportable media type.

12. The method of claim 11, wherein transmitting the response message comprises transmitting the response message, which indicates that the at least one media type is in a transportable state, to the session establishment request client, when the at least one media type contained in the first response message is the same as the at least one stored media type.

13. The method of claim 12, further comprising transmitting the response message, which indicates that the at least one media type contained in the first response message is in the transportable state, to the session establishment request client, when the at least one media type contained in the first response message is not the same as the at least one stored media type as a result of the comparison.

14. The method of claim 12, wherein transmitting the response message comprises:
   inserting User Datagram Protocol (UDP) port numbers assigned to the transportable media in the response message to the session establishment request client.

15. The method of claim 13, wherein transmitting the response message comprises:
   inserting User Datagram Protocol (UDP) port numbers assigned to transportable media in the response message to the session establishment request client.

16. The method of claim 12, further comprising:
   wherein if a response message received in response to the session participation request message is not the first response message, it is determined whether the at least one media type contained in the response message is a portion of the at least one media type supported by a session established between the session establishment request client and the server; and
   wherein if it is determined that the at least one media type contained in the response message is a portion of the at least one media type supported by the session established between the session establishment request client and the server, the server does not update the session.

17. The method of claim 16, further comprising:
   updating the session so that the at least one newly supported media type is in the transportable state, when it is determined that the at least one media type contained in the response message are different from the at least one media type supported by the session established between the session establishment request client and the server.

18. The method of claim 17, wherein updating the session comprises:
   performing the session update according to media attributes of the at least one stored media type contained in the session participation request message, when the server updates the session so that the at least one newly supported media type is in the transportable state.

19. The method of claim 17, wherein updating the session comprises:
transmitting a session participation request message containing UDP port numbers assigned to the at least one newly supported media type for the session update to the session establishment request client.

20. The method of claim 17, wherein when UDP port numbers are assigned to the at least one media type in the initial session establishment, and when the server receives the at least one newly supported media type and transmits a message for updating to a media feature value indicating that the at least one media type can be transmitted, the message for updating is a Media Burst Control Protocol (MBCP) message using a Real-time Transport Control Protocol (RTCP) channel.

21. A method for establishing a multimedia session service in a client of a communication system comprising the session establishment request client, at least one session participation client, and a server for establishing and managing the multimedia communication session, comprising:
generating a session participation request message containing media attribute information and at least one media type required for session establishment;
transmitting the session participation request message to the server for transmitting to at least one session participation client; and
receiving a response message from the server, which indicates that the at least one media type contained in a first response message received from the at least one session participation client is in a transportable state, for establishing the multimedia communication with the at least one transportable media type by comparing the at least one media type in the first response message and at least one transmitted media type.

22. The method of claim 21, wherein the response message indicates that the at least one stored media type is in the transportable state.

23. The method of claim 21, wherein the response message indicates that the at least one media type contained in the first response message is in the transportable state.

24. The method of claim 22, wherein the response message includes User Datagram Protocol (UDP) port numbers assigned to the transportable media.

25. The method of claim 23, wherein the response message includes User Datagram Protocol (UDP) port numbers assigned to the transportable media.

26. The method of claim 21, further comprising:
receiving a session participation request message containing the at least one media type different from the at least one media type supported by the session established between the session establishment request client and the server, when the server receives a response message different from the first response message and the response message contains the at least one media type different from the at least one media type supported by the session established between the session establishment request client and the server; and
transmitting a response message in response to receiving the session participation request message containing the at least one media type different from the at least one media type supported by the session established between the session establishment request client and the server.

27. The method of claim 26, wherein the session participation request message containing the at least one media type different from the at least one media type supported by the session established between the session establishment request client and the server includes User Datagram Protocol (UDP) port numbers assigned to the at least one media type.

* * * * *